United States Patent
Clarke et al.

(10) Patent No.: US 10,420,352 B2
(45) Date of Patent: Sep. 24, 2019

(54) ATMOSPHERE CONTROL AROUND RESPIRING BIOLOGICAL MATERIALS

(71) Applicant: Apio, Inc., Guadalupe, CA (US)

(72) Inventors: Rayond Clarke, Los Altos, CA (US); Angel Reyes, Santa Maria, CA (US)

( * ) Notice: Subject to any disclaimer, the term of this patent is extended or adjusted under 35 U.S.C. 154(b) by 689 days.

(21) Appl. No.: 14/943,022

(22) Filed: Nov. 16, 2015

(65) Prior Publication Data

US 2016/0249630 A1 Sep. 1, 2016

Related U.S. Application Data

(63) Continuation of application No. 13/784,384, filed on Mar. 4, 2013, now Pat. No. 9,351,868.

(60) Provisional application No. 61/632,437, filed on Jan. 23, 2012.

(51) Int. Cl.
| | | |
|---|---|---|
| *A23B 7/148* | (2006.01) | |
| *A23L 3/3418* | (2006.01) | |
| *A23B 7/144* | (2006.01) | |
| *B65D 81/20* | (2006.01) | |
| *B65D 85/34* | (2006.01) | |

(52) U.S. Cl.
CPC ............. *A23B 7/148* (2013.01); *A23B 7/144* (2013.01); *A23L 3/3418* (2013.01); *B65D 81/2076* (2013.01); *B65D 85/34* (2013.01); *A23V 2002/00* (2013.01)

(58) Field of Classification Search
CPC .. A23B 4/10; A23B 7/16; A23B 7/144; A23B 7/148; A23B 7/152; A23L 3/3418
USPC .................. 426/118, 232; 422/292; 128/833
See application file for complete search history.

(56) References Cited

U.S. PATENT DOCUMENTS

| | | |
|---|---|---|
| 2,278,571 A | 4/1942 | Skinner |
| 2,611,709 A | 9/1952 | Plagge et al. |
| 3,102,777 A | 9/1963 | Bedrosian et al. |
| 3,360,380 A | 12/1967 | Bedrosian |
| 3,423,212 A | 1/1969 | Purcell et al. |
| 3,450,542 A | 6/1969 | Badran et al. |
| 3,450,543 A | 6/1969 | Badran et al. |
| 3,450,544 A | 6/1969 | Badran et al. |
| 3,459,116 A | 8/1969 | McDonnell |
| 3,507,667 A | 4/1970 | Magnen |
| 3,574,642 A | 4/1971 | Weinke |
| 3,620,765 A | 11/1971 | McDonnell et al. |
| 3,625,876 A | 12/1971 | Fitko |
| 3,630,759 A | 12/1971 | Rumberger |
| 3,681,092 A | 8/1972 | Titchenal et al. |
| 3,683,788 A | 8/1972 | McDonnell et al. |
| 3,706,410 A | 12/1972 | Baker |
| 3,795,749 A | 3/1974 | Cummin et al. |
| 3,798,333 A | 3/1974 | Cummin |
| 3,804,961 A | 4/1974 | Cummin et al. |
| 3,844,865 A | 10/1974 | Elton et al. |
| 3,903,234 A | 9/1975 | Ikeda et al. |
| 3,924,010 A | 12/1975 | Erb |
| 3,932,692 A | 1/1976 | Hirata et al. |
| 3,951,610 A | 4/1976 | Freebairn et al. |
| 3,975,455 A | 8/1976 | Falender et al. |
| 4,003,728 A | 1/1977 | Rath |
| 4,049,837 A | 9/1977 | Freebairn |
| 4,055,672 A | 10/1977 | Hirsch et al. |
| 4,153,659 A | 5/1979 | Recktenwald |
| 4,176,148 A | 11/1979 | Magder et al. |
| 4,209,538 A | 6/1980 | Woodruff |
| 4,219,965 A | 9/1980 | Freebairn et al. |
| 4,224,347 A | 9/1980 | Woodruff |
| 4,256,770 A | 3/1981 | Rainey |
| 4,322,465 A | 3/1982 | Webster |
| 4,347,844 A | 9/1982 | Ohki et al. |
| 4,350,655 A | 9/1982 | Hoge |
| 4,386,129 A | 5/1983 | Jacoby |
| 4,394,930 A | 7/1983 | Korpman |
| 4,400,291 A | 8/1983 | Freebairn et al. |
| 4,423,080 A | 12/1983 | Bedrosian et al. |
| 4,461,420 A | 7/1984 | Horvath |
| 4,472,328 A | 9/1984 | Sugimoto et al. |

(Continued)

FOREIGN PATENT DOCUMENTS

| | | |
|---|---|---|
| EP | 0311423 | 12/1989 |
| WO | WO 94/12040 | 6/1994 |
| WO | WO 04/060538 | 7/2004 |
| WO | WO 04/107868 | 12/2004 |

(Continued)

OTHER PUBLICATIONS

Marcellin, Storage of Fruits and Vegetables, Revue Generale du Froid, Mar. 3, 1974, 217-236.
Extended European Search Report.
Emond et al. Mathematical Modeling of Gas Exchange in Modified Atmosphere Packaging. American Society of agricultural engineers, 34, (1) 239-245, 1991.
Varriano-Marston et al, Produce Marketing Almanac, 1987, 23-29.
Clarke, "Temperature Switchable Membranes for Packaging Fresh Produce", 2000 TAPPI Polymers, Laminations & Coatings Conference, Nov. 2000, pp. 1257-1271.

(Continued)

Primary Examiner — Jyoti Chawla (57) ABSTRACT

Packaging of respiring biological materials, particularly bananas and other fruits, in sealed containers. The containers preferably include a gas-permeable membrane comprising (1) a microporous film, and (2) a polymeric coating on the microporous film. Using appropriate containers and appropriate controlled atmospheres around the container, the respiring materials can be stored and/or ripened under controlled conditions. Bananas can be ripened while they are being transported, or in conventional ripening rooms without opening the containers in which they have been transported. The ripe bananas are less dehydrated and remain in a satisfactory ripened state for longer periods of time. The gas-permeable membrane can preferably take the form of either a "curtain" or "cartridge" and the R ratio of the membrane may be optimized by adjusting the differential pressure across the membrane.

17 Claims, 1 Drawing Sheet

(56) References Cited

U.S. PATENT DOCUMENTS

| | | |
|---|---|---|
| 4,485,133 A | 11/1984 | Ohtsuka et al. |
| 4,487,791 A | 12/1984 | Komatsu et al. |
| 4,513,015 A | 4/1985 | Clough |
| 4,515,266 A | 5/1985 | Myers |
| 4,528,235 A | 7/1985 | Sacks et al. |
| 4,536,409 A | 8/1985 | Farrell et al. |
| 4,576,014 A | 5/1986 | Miller et al. |
| 4,613,544 A | 9/1986 | Burleigh |
| 4,657,610 A | 4/1987 | Komatsu et al. |
| 4,698,372 A | 10/1987 | Moss |
| 4,705,812 A | 10/1987 | Ito et al. |
| 4,704,238 A | 11/1987 | Okuyama et al. |
| 4,705,813 A | 11/1987 | Ito et al. |
| 4,734,324 A | 3/1988 | Hill |
| 4,759,444 A | 7/1988 | Barmore |
| 4,759,935 A | 7/1988 | Toshitsugu |
| 4,769,262 A | 9/1988 | Ferrar et al. |
| 4,779,524 A | 12/1988 | Wade |
| 4,821,489 A | 4/1989 | MacLeod et al. |
| 4,830,863 A | 5/1989 | Jones |
| 4,833,172 A | 5/1989 | Schwarz et al. |
| 4,840,823 A | 6/1989 | Chigami et al. |
| 4,842,875 A | 6/1989 | Anderson |
| 4,847,145 A | 7/1989 | Matsui |
| 4,856,650 A | 8/1989 | Inoue |
| 4,861,644 A | 8/1989 | Young et al. |
| 4,863,788 A | 9/1989 | Bellairs et al. |
| 4,876,146 A | 10/1989 | Isaka et al. |
| 4,877,679 A | 10/1989 | Leatherman et al. |
| 4,879,078 A | 11/1989 | Antoon |
| 4,883,674 A | 11/1989 | Fan |
| 4,885,086 A | 12/1989 | Miura |
| 4,886,372 A | 12/1989 | Greengrass et al. |
| 4,892,779 A | 1/1990 | Leatherman et al. |
| 4,910,032 A | 3/1990 | Antoon |
| 4,923,650 A | 5/1990 | Antoon et al. |
| 4,923,703 A | 5/1990 | Antoon |
| 4,937,115 A | 6/1990 | Leatherman |
| 4,939,030 A | 7/1990 | Tsuji et al. |
| 4,943,440 A | 7/1990 | Armstrong |
| 4,956,209 A | 9/1990 | Isaka et al. |
| 4,960,639 A | 10/1990 | Oda et al. |
| 4,962,777 A | 10/1990 | Bell |
| 4,973,625 A | 11/1990 | Deyrup |
| 4,987,745 A | 2/1991 | Harris |
| 4,996,071 A | 2/1991 | Bell |
| 5,039,565 A | 2/1991 | Deyrup |
| 5,041,290 A | 3/1991 | Wallace |
| 5,006,342 A | 4/1991 | Cleary et al. |
| 5,008,296 A | 4/1991 | Antoon et al. |
| 5,011,698 A | 4/1991 | Antoon et al. |
| 5,045,331 A | 4/1991 | Antoon |
| 5,026,591 A | 6/1991 | Henn et al. |
| 5,063,753 A | 6/1991 | Woodruff |
| 5,032,450 A | 7/1991 | Rechlicz et al. |
| 5,035,933 A | 7/1991 | Ilenda et al. |
| 5,066,683 A | 11/1991 | Dillon et al. |
| 5,110,677 A | 5/1992 | Barmore et al. |
| 5,126,197 A | 6/1992 | Schinkel et al. |
| 5,153,039 A | 10/1992 | Porter et al. |
| 5,160,768 A | 11/1992 | Antoon |
| 5,164,258 A | 11/1992 | Shida et al. |
| 5,165,947 A | 11/1992 | Colucci et al. |
| 5,176,953 A | 1/1993 | Jacoby et al. |
| 5,196,262 A | 5/1993 | Schwarz et al. |
| 5,221,571 A | 6/1993 | Cammiss et al. |
| 5,254,074 A | 10/1993 | Landers et al. |
| 5,254,354 A | 10/1993 | Stewart |
| 5,254,401 A | 10/1993 | Kelch et al. |
| 5,256,473 A | 10/1993 | Kotani et al. |
| 5,260,360 A | 11/1993 | Mrozinski et al. |
| 5,271,976 A | 12/1993 | Kondo et al. |
| 5,275,854 A | 1/1994 | Maier et al. |
| 5,279,843 A | 1/1994 | Zomorodi |
| 5,300,570 A | 4/1994 | Ilenda et al. |
| 5,316,778 A | 5/1994 | Hougham |
| 5,317,035 A | 5/1994 | Jacoby et al. |
| 5,322,726 A | 6/1994 | Dew |
| 5,332,617 A | 7/1994 | Mills et al. |
| 5,333,394 A | 7/1994 | Herdeman |
| 5,339,602 A | 8/1994 | Landers et al. |
| 5,348,752 A | 9/1994 | Gorlich |
| 5,352,513 A | 10/1994 | Mrozinski et al. |
| 5,362,531 A | 11/1994 | Samuel et al. |
| 5,411,351 A | 5/1995 | Lasch et al. |
| 5,427,807 A | 6/1995 | Chum et al. |
| 5,429,833 A | 7/1995 | Wyslotsky |
| 5,433,335 A | 7/1995 | Raudalus |
| 5,443,851 A | 8/1995 | Christie et al. |
| 5,458,899 A | 10/1995 | Floyd et al. |
| 5,460,841 A | 10/1995 | Herdeman |
| 5,516,539 A | 5/1996 | Walsh et al. |
| 5,532,053 A | 7/1996 | Mueller |
| 5,556,658 A | 9/1996 | Raudalus |
| 5,560,947 A | 10/1996 | Bell |
| 5,565,230 A | 10/1996 | Bailey |
| 5,575,418 A | 11/1996 | Wu et al. |
| 5,658,607 A | 8/1997 | Herdeman |
| 5,667,827 A | 9/1997 | Breen et al. |
| 5,688,509 A | 11/1997 | Radwan et al. |
| 5,711,978 A | 1/1998 | Breen et al. |
| 5,730,311 A | 3/1998 | Curtis |
| 5,747,082 A | 5/1998 | Floyd et al. |
| 5,759,650 A | 6/1998 | Raines et al. |
| 5,799,495 A | 9/1998 | Gast et al. |
| 5,807,630 A | 9/1998 | Christie et al. |
| 5,811,142 A | 9/1998 | Del Duca et al. |
| 5,820,955 A | 10/1998 | Brander |
| 5,832,699 A | 11/1998 | Zobel |
| 5,840,235 A | 11/1998 | Yagi et al. |
| 5,849,127 A | 12/1998 | Kuo |
| 5,865,335 A | 2/1999 | Farrell et al. |
| 5,866,172 A | 2/1999 | Parks |
| 5,866,184 A | 2/1999 | Gorlich et al. |
| 5,866,649 A | 2/1999 | Hong et al. |
| 5,872,721 A | 2/1999 | Huston et al. |
| 5,908,649 A | 6/1999 | Floyd et al. |
| 5,916,614 A | 6/1999 | Gorlich |
| 5,932,497 A | 8/1999 | Morman et al. |
| 5,935,681 A | 8/1999 | Paulett |
| 5,954,067 A | 9/1999 | Brown et al. |
| 5,958,319 A | 9/1999 | Brant |
| 6,013,293 A | 1/2000 | DeMoor |
| 6,050,412 A | 4/2000 | Clough et al. |
| 6,060,136 A | 5/2000 | Patrick et al. |
| 6,063,505 A | 5/2000 | Kuratsuji et al. |
| 6,085,930 A | 7/2000 | Curtis |
| 6,152,295 A | 11/2000 | Brander et al. |
| 6,189,299 B1 | 2/2001 | Brown et al. |
| 6,190,710 B1 | 2/2001 | Nir et al. |
| 6,210,724 B1 | 4/2001 | Clarke et al. |
| 6,248,380 B1 | 6/2001 | Kocher et al. |
| 6,296,923 B1 | 10/2001 | Zobel |
| 6,376,032 B1 | 4/2002 | Clarke et al. |
| 6,548,132 B1 | 4/2003 | Clarke et al. |
| 7,329,452 B2 | 2/2008 | Clarke |
| 7,601,202 B2 | 10/2009 | Noack et al. |
| 7,601,374 B2 | 10/2009 | Clarke |
| 7,866,258 B2 | 1/2011 | Jorgenson |
| 8,092,848 B2 | 1/2012 | Clarke |
| 8,110,232 B2 | 2/2012 | Clarke |
| 8,177,883 B2 | 2/2012 | Maersk |
| 2003/0057217 A1 | 3/2003 | Wyslotsky et al. |
| 2005/0266129 A1 | 12/2005 | Mir |
| 2007/0259082 A1 | 11/2007 | Clarke et al. |
| 2008/0008793 A1 | 1/2008 | Forsyth et al. |
| 2008/0008794 A1 | 1/2008 | Forsyth et al. |
| 2008/0202262 A1 | 8/2008 | Schmidt et al. |
| 2009/0104317 A1 | 4/2009 | Clarke |

(56) References Cited

U.S. PATENT DOCUMENTS

2010/0127059 A1     5/2010  Lim et al.
2011/0293802 A1    12/2011  Alfaro et al.

FOREIGN PATENT DOCUMENTS

WO     WO 05/074466    8/2005
WO     WO 08/17307     2/2008

OTHER PUBLICATIONS

Mannapperuma et al, "Design of Polymeric Packages for Modified Atmosphere Storage of Fresh Produce", Proc. 5$^{th}$ Int'l Res. Conf, vol. 2, pp. 225-233.
PCT Search Report.

ATMOSPHERE CONTROL AROUND RESPIRING BIOLOGICAL MATERIALS

CROSS-REFERENCE TO RELATED APPLICATION

This application is a continuation of, and claims the priority of, U.S. patent application Ser. No. 13/784,384, filed Mar. 4, 2013, now U.S. Pat. No. 9,185,920. This application also claims the benefit of priority from U.S. Provisional Patent Application Ser. No. 61/632,437, filed on Jan. 23, 2012. The entire disclosure of each of U.S. patent application Ser. No. 13/784,384, U.S. Pat. No. 9,185,920 and U.S. Provisional Patent Application Ser. No. 61/632,437 is incorporated herein by reference for all purposes.

BACKGROUND

This invention relates to the control of atmospheres around respiring biological materials.

Respiring biological materials, e.g., fruits and vegetables, consume oxygen ($O_2$) and produce carbon dioxide ($CO_2$) at rates which depend upon the stage of their development, the atmosphere surrounding them and the temperature. In modified atmosphere packaging (MAP), the respiring materials are surrounded by a packaging atmosphere in a sealed container and the packaging atmosphere is controlled by providing an atmosphere control member (ACM) which (a) has one surface in contact with the packaging atmosphere and an opposite surface in contact with an external atmosphere and (b) has a permeability to $O_2$ and $CO_2$ such that gas exchange of $O_2$ and $CO_2$ through the ACM produces the desired packaging atmosphere. In controlled atmosphere packaging (CAP), by contrast, the desired packaging atmosphere is produced, initially and/or on a continuous or discontinuous program, simply by displacing some or all of the atmosphere within a sealed container by one or more gases, e.g., nitrogen, $O_2$ and $CO_2$, in desired proportions.

For further details of MAP and CAP, reference may be made, for example, to U.S. Pat. No. 3,360,380 (Bedrosian), U.S. Pat. No. 3,450,542 (Badran), U.S. Pat. No. 3,450,544 (Badran et al.), U.S. Pat. No. 3,798,333 (Cummin et al), U.S. Pat. No. 3,924,010 (Erb), U.S. Pat. No. 4,003,728 (Rath), U.S. Pat. No. 4,734,324 (Hill), U.S. Pat. No. 4,779,524 (Wade), U.S. Pat. No. 4,830,863 (Jones), U.S. Pat. No. 4,842,875 (Anderson), U.S. Pat. No. 4,879,078 (Antoon), U.S. Pat. No. 4,910,032 (Antoon), U.S. Pat. No. 4,923,703 (Antoon), U.S. Pat. No. 4,987,745 (Harris), U.S. Pat. No. 5,041,290 (Wallace et al.) U.S. Pat. No. 5,045,331 (Antoon), U.S. Pat. No. 5,063,753 (Woodruff), U.S. Pat. No. 5,160,768 (Antoon), U.S. Pat. No. 5,254,354 (Stewart), U.S. Pat. No. 5,333,394 (Herdeman), U.S. Pat. No. 5,433,335 (Raudalus et al.), U.S. Pat. No. 5,443,851 (Christie et al.), U.S. Pat. No. 5,460,841 (Herdeman), U.S. Pat. No. 5,556,658 (Raudalus et al.), U.S. Pat. No. 5,658,607 (Herdeman), U.S. Pat. No. 5,807,630 (Christie et al.), U.S. Pat. No. 5,832,699 (Zobel), U.S. Pat. No. 5,872,721 (Huston et al.), U.S. Pat. No. 6,013,293 (De Moor), U.S. Pat. No. 6,190,710 (Nir et al), U.S. Pat. No. 6,210,724 (Clarke et al.), U.S. Pat. No. 6,296,923 (Zobel), U.S. Pat. No. 6,376,032 (Clarke et al.), U.S. Pat. No. 6,548,132 (Clarke et al.), U.S. Pat. No. 7,329,452 (Clarke), U.S. Pat. No. 7,601,202 (Noack et al), U.S. Pat. No. 7,601,374 (Clarke), U.S. Pat. No. 7,801,374 (Clarke), U.S. Pat. No. 7,866,258 (Jorgensen), and U.S. Pat. No. 8,177,883 (Maersk); copending commonly assigned U.S. application Ser. No. 09/580,379 (Clarke) and U.S. Ser. No. 09/858,190 (Clarke); US Patent Application Publication Nos. 2003/0057217 (Wyslotsky), 2005/0266129 (Mir), 2007/0259082 (Clarke et al.), 2008/0008793 and 2008/0008794 (Forsyth et al.), 2008/0202262 (Schmidt et al.), and 2011/0293802 (Alfaro et al.); International Publication Nos. WO 94/12040 (Fresh Western), WO 96/38495 (Landec), WO 00/04787 (Landec), WO 01/92118 (Landec), WO 03/043447 (Landec), WO 2004/060538 (Blue Membranes), WO 2004/10868 (Maersk), WO 2005/074466 (Landec) and WO 2008/17307 (Maersk); and European Applications Nos. 0,351,115 and 0,351,116 (Courtaulds). The disclosure of each of those patents, applications and publications is incorporated herein by reference in their entirety for all purposes.

SUMMARY OF THE INVENTION

This invention is concerned with the control of packaging atmospheres around respiring biological materials, and novel atmosphere control members which are useful in such control, and for other purposes. Although the invention is not limited to the control of atmospheres within shipping containers containing respiring biological materials, it is of particular interest for this purpose. We have found that in order to provide effective control of atmospheres within shipping containers, it is necessary to depart from the accepted criteria for designing an effective atmosphere control member. In particular, we have discovered that because shipping containers often contain multiple air leaks, and because it is essential to ensure that the atmospheric pressure within the storage area of the shipping container is at or not too far below atmospheric pressure, it is essential to make use of an atmosphere control member with an R ratio of at least 4.3, preferably at least 5 and an oxygen transmission ratio (OTR) of at least 620,000 ml/$m^2$.atm.24 hr (40,000 cc/100 $in^2$.atm.24 hr).

A first aspect of the invention provides an assembly which comprises:
(1) a shipping container,
(2) respiring biological material which is within the shipping container and which is surrounded by a packaging atmosphere,
(3) an atmosphere control member (ACM) which (a) has an area of at least 0.06 $m^2$, (b) is permeable to oxygen and carbon dioxide, has an oxygen transmission ratio (OTR) of at least 620,000 ml/$m^2$.atm.24 hr (40,000 cc/100 $in^2$.atm.24 hr) and a ratio of carbon dioxide permeability to oxygen permeability (R ratio) of at least 4.3, preferably at least 5, (c) has a first surface which is in contact with the packaging atmosphere, and (d) has a second surface which is in contact with a second atmosphere, and
(4) means for causing the second atmosphere to flow over the second surface of the ACM and/or means for causing the packaging atmosphere to flow over the first surface of the ACM.

A second aspect of the invention is an assembly which comprises
(1) a substantially closed chamber comprising a wall comprising an atmosphere control member (ACM) which (a) has an area of at least 0.06 $m^2$, (b) is permeable to oxygen and carbon dioxide and has an oxygen transmission ratio (OTR) of at least 620,000 ml/$m^2$.atm.24 hr (40,000 cc/100 $in^2$.atm.24 hr) and an R ratio of at least 4.3, preferably at least 5, (c) has a first surface which is in contact with a first atmosphere and (d) has a second surface which is in contact with a second atmosphere, (2) first means for delivering gas into the chamber,
(3) second means for removing gas from the chamber,
(4) third means for maintaining a desired difference between the pressure of the first atmosphere and the pressure of the second atmosphere, for example, a controller which can be operated so that the rate at which gas is removed from the chamber is greater than the rate at which gas is passed into the chamber or alternatively so the rate at which gas is removed from the chamber is less than the rate at which gas is passed into the chamber.

A third aspect of the invention is an assembly which comprises
(1) a substantially closed chamber comprising a wall comprising an atmosphere control member (ACM) which (a) has an area of at least 0.06 m$^2$, and (b) is permeable to oxygen and carbon dioxide and has an oxygen transmission ratio (OTR) of at least 620,000 ml/m$^2$.atm.24 hr (40,000 cc/100 in$^2$.atm.24 hr) and an R ratio of at least 4.3, preferably at least 5, at least a part of the ACM being in the form of a folded sheet obtainable by folding a sheet comprising the ACM in a way which does not substantially reduce the exposed surface of the ACM, for example, by folding a substantially planar ACM into multiple pleats, and
(2) an inlet for delivering gas into the chamber, and
(3) an outlet for removing gas from the chamber.

Some of the ACMs which can be used in the first, second and third aspects of the invention are novel in their own right, and are also useful in assemblies which do not fall within the definition of the first, second or third aspect of the invention. These novel ACMs provide the fourth, fifth, sixth and seventh aspects of the invention.

A fourth aspect of the invention is an atmosphere control member which (a) has an area of at least 0.06 m$^2$, (b) is permeable to oxygen and carbon dioxide and has an oxygen transmission ratio (OTR) of at least 620,000 ml/m$^2$.atm.24 hr (40,000 cc/100 in$^2$.atm.24 hr) and an R ratio of at least 4.3, preferably at least 5, and (c) comprises a porous substrate and a coating on the porous substrate, the coating comprising a polymer which is amorphous at temperatures below 20° C. and comprises 10 to 90% by weight of units derived from a highly polar monomer.

A fifth aspect of the invention is a substantially planar flexible sheet which comprises (1) an atmosphere control member (ACM) which (a) has an area of at least 0.06 m$^2$, and (b) is permeable to oxygen and carbon dioxide and has an oxygen transmission ratio (OTR) of at least 620,000 ml/m$^2$.atm.24 hr (40,000 cc/100 in$^2$.atm.24 hr) and an R ratio of at least 4.3, preferably at least 5, and (2) a one-way valve which opens when the pressure on one side of the sheet exceeds the pressure on the other side of the sheet by a preset minimum. When such an ACM-containing sheet is used to control the packaging atmosphere within a shipping container, the assembly preferably does not include other valves which enable air to enter the packaging atmosphere. However, in practice it is understood that containers are often built with such valves, the aspects herein are as applicable—perhaps more needed—in such valved containers due to additional air "leaks" therefrom.

A sixth aspect of the invention is an atmosphere control member (ACM) which (a) has an area of at least 0.06 m$^2$, and (b) is permeable to oxygen and carbon dioxide and has an oxygen transmission ratio (OTR) of at least 620,000 ml/m$^2$.atm.24 hr (40,000 cc/100 in$^2$.atm.24 hr) and an R ratio of at least 4.3, preferably at least 5, at least a part of the ACM being in the form of a folded sheet obtainable by folding a sheet comprising the ACM in a way which does not substantially reduce the exposed surface of the ACM, for example, by folding a substantially planar ACM into multiple pleats.

A seventh aspect of the invention is an atmosphere control member (ACM) which comprises a porous substrate and a polymeric coating on the substrate, the polymeric coating comprising a polymer which has a melting point below 20° C. and which comprises units derived from one or more n-alkyl acrylates and/or n-alkyl methacrylates in which the n-alkyl moiety contains 10-16 carbon atoms, e.g., 12 or 14 carbon atoms, such units preferably being present in an amount of 30-60%.

An eighth aspect of the invention is a method of controlling the oxygen and carbon dioxide contents of a packaging atmosphere inside a container which contains a respiring biological material surrounded by the packaging atmosphere, the container comprising an atmosphere control member having the packaging atmosphere contacting a first surface and a second atmosphere contacting a second opposite surface, the method comprising adjusting the pressure of the second atmosphere on the second surface of the atmosphere control member in response to the oxygen and/or carbon dioxide content of the packaging atmosphere.

BRIEF DESCRIPTION OF THE DRAWINGS

The invention is illustrated in the accompanying drawings, which are diagrammatic; which are not to scale; and in which the Figures illustrate the invention. The use of the same reference symbol in different Figures indicates the same or identical elements.

DETAILED DESCRIPTION OF THE INVENTION

In the Summary of the Invention above and in the Detailed Description of the Invention, the Examples, and the Claims below, reference is made to particular features (including method steps) of the invention. It is to be understood that the disclosure of the invention in this specification includes all appropriate combinations of such particular features. For example, where a particular feature is disclosed in the context of a particular aspect or embodiment of the invention, or a particular claim, that feature can also be used, to the extent appropriate, in combination with and/or in the context of other particular aspects and embodiments of the invention, and in the invention generally.

The term "comprises" and grammatical equivalents thereof are used herein to mean that other elements (i.e. components, ingredients, steps etc.) are optionally present. For example, a structure "comprising" (or "which comprises") components A, B and C can contain only components A, B and C, or can contain not only components A, B and C but also one or more other components.

The term "consisting essentially of" and grammatical equivalents thereof is used herein to mean that other elements may be present which do not materially alter the disclosed invention.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1, and "at least 80%" means 80% or more than 80%.

The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this specification, a range is given as "(a first number) to (a second number)" or "(a first number)-(a second number)", this means a range whose lower limit is the first number and whose upper limit is the second number. For example, "from 2 to 16 $m^3$" or "2-16 $m^3$" means a range whose lower limit is 2 $m^3$ and whose upper limit is 16 $m^3$. The numbers given herein should be construed with the latitude appropriate to their context and expression.

The terms "a", "an" and "the" before an item are used herein to mean that there can be a single such item or two or more such items, unless the context makes this impossible. For example, where reference is made to a container including an ACM, this includes the possibility that the container includes one ACM or a plurality of ACMs; similarly where reference is made to a wall comprising an ACM, this includes the possibility that there are two or more such walls, and that each such wall comprises one or more ACMs.

The term "plurality" is used herein to mean two or more.

In describing and claiming the invention below, the following abbreviations, definitions, and methods of measurement (in addition to those already given) are used.

OTR and carbon dioxide transmission ratio (COTR) values are given in ml/$m^2$.atm.24 hr, with the equivalent in cc/100 $inch^2$.atm.24 hrs. in parentheses, and are measured at 20° C. and a constant pressure of 0.035 kg/$cm^2$ (0.5 psi) where the pressure difference on either side of the ACM is at a minimum, unless otherwise noted, for example, using a permeability cell (for example, as supplied by Millipore) in which a mixture of $O_2$, $CO_2$ and helium is applied to the sample, and the gases passing through the sample are analyzed for $O_2$ and $CO_2$ by a gas chromatograph. The cell could be placed in a water bath to control the temperature. The abbreviation $P_{10}$ is used to mean the ratio of the permeability, to $O_2$ or $CO_2$ as specified, at a first temperature $T_1$° C. to the permeability at a second temperature $T_2$, where $T_2$ is $(T_1-10)$° C. $T_1$ being 10° C. and $T_2$ being 0° C. unless otherwise noted. The abbreviation R or R ratio is used to mean the ratio of COTR to OTR, both permeabilities being measured at 20° C. unless otherwise noted. Pore sizes are measured by mercury porosimetry. Parts and percentages are by weight, except for percentages of gases, which are by volume. Unless otherwise specified, temperatures are in degrees Centigrade. For crystalline polymers, the abbreviation $T_o$ is used to mean the onset of melting, the abbreviation $T_p$ is used to mean the crystalline melting point, and the abbreviation ΔH is used to mean the heat of fusion. $T_o$, $T_p$ and ΔH are measured by means of a differential scanning calorimeter (DSC) at a rate of 10° C./minute and on the second heating cycle. $T_o$ and $T_p$ are measured in the conventional way well known to those skilled in the art. Thus $T_p$ is the temperature at the peak of the DSC curve, and $T_o$ is the temperature at the intersection of the baseline of the DSC peak and the onset line, the onset line being defined as the tangent to the steepest part of the DSC curve below $T_p$.

The term "atmosphere control member" (often abbreviated herein to ACM) is used herein to denote a member which is permeable to oxygen and carbon dioxide and which has a first surface and an opposite second surface. When the ACM is in use, the first surface is in contact with a first atmosphere which contains one or both of oxygen and carbon dioxide (for example, a packaging atmosphere surrounding a respiring organic material), and the second surface is in contact with a second atmosphere which contains one or both of oxygen and carbon dioxide (for example, air), and oxygen and carbon dioxide pass through the ACM, between the first atmosphere and the second atmosphere, at rates which depend upon the partial pressures of oxygen and carbon dioxide in the first and second atmospheres, and upon the nature of the ACM. In this way, an ACM can be used, for example, to ensure that a packaging atmosphere is different from air. The ACM is preferably such that, at the temperature of operation, at least 75% of the oxygen entering the packaging atmosphere passes through the ACM. In some cases, the ACM provides substantially the only pathways for oxygen and carbon dioxide to enter or leave the packaging atmosphere. In other cases, particularly in shipping containers, which contain leaks, much less of the oxygen entering the packaging atmosphere passes through the ACM, for example, 30-90%, or 60-80%. Preferably the ACM is such that after 24 hours of operation, the packaging atmosphere contains less than 18% oxygen, e.g., 2-15% oxygen.

Known ACMs comprise the ACMs disclosed in the documents incorporated by reference herein, for example, (i) a woven or nonwoven material, optionally having a polymer coating thereon, as described, for example, in U.S. Pat. No. 5,045,331 (Antoon); (ii) a microporous film, optionally having a polymeric coating thereon, as described, for example, in U.S. Pat. Nos. 4,879,078, 4,842,875, 5,160,768 and 6,376,032; or (iii) one or more perforations (which may be close together or spaced-apart) having a size such that they control the packaging atmosphere, as described, for example, in U.S. Patent Publication No. 2003/0057217, U.S. Pat. Nos. 5,832,699 and 6,296,923, and European Application 0351116. ACMs comprising (a) a woven or nonwoven material having a polymeric coating thereon or (b) a microporous film having a polymeric coating thereon, have an R ratio greater than 1, and are referred to herein to as selective ACMs. An ACM in the form of perforations has an R ratio of about 1, and is referred to herein as a non-selective ACM. A nonselective ACM can, for example, comprise a single relatively large perforation and/or a plurality of relatively small perforations, e.g., having a size of 10 to 1000 mu., e.g., 50 to 600 mu, for example, a film microperforated with holes of 0.3 to 0.8 mm diameter in a density of up to about 500 holes per square meter.

ACMs

The ACMs used in the assemblies of the first, second and third aspects of the invention are selective ACMs which have an area of at least 0.06 $m^2$, an oxygen transmission ratio (OTR) of at least 620,000 (40,000) and an R ratio of at least 4.3, preferably at least 5. The ACMs used in these assemblies can be, but are not necessarily, ACMs as defined in the fourth, fifth, sixth and seventh aspects of the invention.

Selective ACMs make use of a coating of a polymeric composition on a porous substrate. The chemical constitution of the polymer in the polymeric composition has an important effect on the R ratio and the OTR of the ACM. The OTR depends on the intrinsic permeability of the polymer and the thickness of the coating. Theoretically, even when using a polymer having a very low intrinsic permeability, it is possible to make the thickness of the coating so small that a desired OTR is produced. Practically, however, it is difficult or impossible to make an ACM having a useful OTR when using a polymer which has a very low intrinsic permeability, for example, an intrinsic permeability to oxygen, measured at 35° C. and 2 bar, of less than 40. Not only is it extremely difficult to produce a uniform layer of the necessary very small thickness, particularly when the area of the ACM is large, but the resulting product is easily damaged during handling or deliberate folding.

The ACMs of the present invention, and the ACMs used in the assemblies of the present invention, preferably make use of a coating polymer which will result in an OTR of at least 620,000 (40,000) preferably at least 775,000 (50,000), particularly at least 1,550,000 (100,000) when coated at a thickness of at least 1.5μ, preferably at least 2.0μ, for example, in the range 2-4μ.

The assemblies of the invention can make use of a single ACM having an area of at least 0.06 m² and an R ratio of at least 4.3, preferably at least 5; or two or more ACMs each having an area of at least 0.06 m² and an R ratio of at least 4.3, preferably at least 5; or a combination of two or more ACMs, at least one of which has an area of at least 0.06 m² and an R ratio of at least 4.3, preferably at least 5 and an ACM which has a smaller area and/or a smaller R ratio and which may be a selective ACM or a nonselective ACM, provided that the combination has an R ratio of at least 4.3, preferably at least 5. For example, these assemblies can make use of an ACM which (a) has an area of at least 0.06 m², (b) has an R ratio of at least 4.3, preferably at least 5, (c) comprises a porous substrate and a polymeric coating on the substrate, and (d) contains perforations, for example, perforations as disclosed above, provided that the perforations do not reduce the R ratio to less than 5.

The ACMs (or combination of ACMs) used in the assemblies of the invention, and the ACMs of the fourth, fifth, sixth and seventh aspects of the invention, preferably have an OTR of at least 775,000 (50,000), particularly at least 1,550,000 (100,000), e.g., at least 2,325,000 (150,000). For some uses, a higher OTR, e.g., at least 7,750,000 (500,000) or at least 13,590,000 (900,000), is preferred. In some cases, it is preferred that the ACM has an oxygen $P_{10}$ ratio, over at least one 10° C. range between −5 and 15° C., of at least 1.3, e.g., at least 2.6.

When the ACM includes a microporous polymeric film which serves as a support for the polymeric coating, the microporous film comprises a network of interconnected pores such that gases can pass through the film. Preferably the pores have an average pore size of less than 0.24 micron. Other optional features of the microporous film include:

(a) at least 70%, e.g., at least 90%, of the pores having a pore size of less than 0.24 micron;
(b) at least 80% of the pores have a pore size less than 0.15 micron;
(c) less than 20% of the pores have a pore size less than 0.014 micron;
(d) the pores constitute 35 to 80% by volume of the microporous film;
(e) the microporous film comprises a polymeric matrix comprising ultrahigh molecular weight polyethylene or polypropylene;
(f) the microporous film contains 30 to 90% by weight, based on the weight of the film, of a finely divided particulate substantially insoluble filler, preferably a siliceous filler, which is distributed throughout the film;
(e) the microporous film is prepared by treating an extruded and calendered sheet comprising a powdered polymeric matrix material, a filler, and a processing oil with an organic extraction liquid to remove the processing oil; followed by extraction of the extraction liquid with water or steam.

Suitable microporous films are available under the trade name Teslin.

The ACMs used in the assemblies of the present invention, and the ACMs of the fourth, fifth and sixth aspects of the invention have, and the ACM's of the seventh aspect of the invention preferably have, an area greater than 0.06 m² (100 in²), e.g., greater than 0.65 m² (1000 in²). In some embodiments, the ACM has an area of 0.06 to 13 m² (100 to 20,000 in²), for example, 0.65 to 6.5 m² (1000 to 10,000 in²).

The ACMs used in the assemblies of the present invention and the ACMs of the fourth, fifth and sixth aspects of the invention have, and the ACMs of the seventh aspect of the invention preferably have, an R ratio at 20° C. of at least 4.3, preferably at least 5, preferably at least 6, for example, at least 7, or at least 8, or at least 9; also, they preferably have an R ratio at 15° C. of at least 7, particularly at least 8 or at least 9, and/or an R ratio at 1° C. of at least 10, particularly at least 11 or at least 12.

The ACMs used in the assemblies of the present invention, and the ACMs of the fourth and seventh aspects of the invention, can have any convenient shape and configuration. For example, the ACM can be a substantially planar sheet, or a folded sheet obtainable by folding a substantially planar sheet without substantially reducing the exposed surface of the sheet, for example, into multiple pleats. The ACMs of the fifth aspect of the invention, as noted above, are part or all of a substantially planar flexible sheet. The ACMs of the sixth aspect of the invention, as noted above, are in the form of a folded sheet.

The ACMs used in the assemblies of the present invention, and the ACMs of the fourth, fifth, sixth and seventh aspects of the invention, can, for example, have one or more of the following characteristics.

(a) It has an invariable effective size.
(b) It is associated with means for changing, preferably reversibly changing, its effective size, for example, a retractable cover.
(c) It is supported by a support member, e.g., a metal grille or protective plastic mesh, which is sufficiently permeable to gas that it has substantially no effect on the ACM except to reduce its effective area by a relatively small amount, e.g., by at most 25%. For example, the ACM can be sandwiched between two such support members. The support members are particularly useful if there is a substantial difference between the pressures on the faces of the ACM, in order to avoid distortion of the ACM by the pressure difference. Preferably, the pressure difference is small, e.g., less than 0.3 in. of water. Optionally, in order to protect the ACM from physical damage, for example, from the respiring biological material or packages containing the respiring biological material, it can be covered by an apertured member, e.g., a metal grille, which provides the desired physical protection during handling but has little or no effect on the ACM's ability to control the atmosphere within the container.

The ACMs of the Fourth Aspect of the Invention

In the fourth aspect of the invention, the ACM comprises a porous substrate, for example, a microporous polymeric film as disclosed above, and a coating on the porous substrate, the coating comprising at least one polymer which is amorphous at temperatures below 20° C. and which comprises units derived from one or more highly polar monomers, for example, which contains 10 to 90%, preferably 20 to 60%, by weight of units derived from a highly polar monomer. The ACM preferably (a) has an area of at least 0.06 m$^2$, and (b) has an OTR of at least 620,000 (40,000) and an R ratio of at least 4.3, preferably at least 5. The amorphous polymer can be the sole polymeric ingredient of the coating, or it can be blended with another polymer, which can be amorphous or crystalline, for example, poly 4-methyl pentene, an ethylene propylene rubber, a polyurethane, or another polymer disclosed below. The amorphous polymer can, for example, be a homopolymer or a random, graft or block copolymer, and can be free of cross-linking or can be cross-linked. Optionally, the amorphous polymer can have one or more of the following characteristics:

(1) The highly polar monomer comprises polyoxyalkylene moieties, for example, polyoxyethylene and/or polyoxypropylene and/or polyoxybutylene moieties. For example, the polymer can comprise units derived from polyethylene glycol acrylate or methacrylate.

(2) The monomer comprises siloxane moieties. For example, the polymer comprises units derived from monomethylacryloyl oxypropylene-terminated polydimethyl siloxanes or another siloxane which has terminal groups, e.g., amine groups, which enable it to be polymerized. In another example, the polymer comprises units derived from a vinyl-terminated polydimethyl siloxane or a polymer formed by cross-linking a vinyl-containing polydimethyl siloxane and a containing polydimethyl siloxane, for example, using chloroplatinic acid as a catalyst. Polysiloxanes are particularly useful when high permeabilities, e.g., an OTR of at least 4.3, preferably at least 500,000 or at least 900,000 cc/100 inch$^2$.atm.24 hrs., are desired.

(3) The polymer is a polyacrylate comprising units derived from one or more highly polar acrylate monomers, for example, as described in (1) and (2) above.

(4) The polymer is a copolymer which comprises units derived from (a) one or more n-alkyl acrylates and/or n-alkyl methacrylates in which the n-alkyl moiety contains 10-16 carbon atoms, e.g., 12 or 14 carbon atoms, preferably in an amount of 30-60%, and (b) units derived from one or more highly polar acrylate or methacrylate monomers, for example, as described in (1) and (2) above, preferably in an amount of 20 to 60%. Optionally, the copolymer also includes, for example, in an amount of 6-15%, repeating units derived from one or more monomers selected from n-alkyl acrylates in which the n-alkyl moiety contains 2-8 carbon atoms, for example, hexyl acrylate, n-alkyl methacrylates in which the n-alkyl moiety contains 2-8 carbon atoms, hydroxy alkyl acrylates, acrylic acid, methacrylic acid. Specific classes of such copolymers include (1) a copolymer of tetradecyl acrylate, hexyl acrylate, acrylic acid, MPEG 350 (polyethylene glycol methacrylate) and MCRM 17 (polydimethyl siloxane terminated at one end only by a methacryoyloxypropyl group) in proportions of 14-15 (e.g., about 14.7)/10-12 (e.g., about 11.3)/about 3/about 46/about 25; and (2) a copolymer of dodecyl acrylate, acrylic acid, MPEG 350 and MCRM 17 in proportions of 24-28 (e.g., about 26)/about 3/about 31/about 40.

The ACMs of the Fifth Aspect of the Invention

The fifth aspect of the invention is a substantially planar flexible sheet which comprises (1) an atmosphere control member (ACM) which (a) has an area of at least 0.06 m$^2$, and (b) is permeable to oxygen and carbon dioxide and has an R ratio of at least 4.3, preferably at least 5, and (2) a one-way valve which opens when the pressure on one side of a) the sheet exceeds the pressure on the other side of the sheet by a preset minimum, for example, a minimum within the range of 0.005-0.2 PSI. A suitable valve is available from Pacific Bag Incorporated, Woodinville, Wash.

The sheet can consist essentially of the atmosphere control member and the valve. The sheet is particularly useful in an assembly according to the first aspect of the invention which (as further discussed below) comprises, at one end of a shipping container, a closed chamber which is formed by (1) the sheet, which is secured across the cross-section of the container near the end of the shipping container, and (2) the end wall of the container and the bottom, top and side walls of the container at the end of the container. A second atmosphere, for example, air, is passed through the closed chamber, and the ACM regulates oxygen and carbon dioxide exchange through the ACM, thus controlling the packaging atmosphere. The one-way valve allows the second atmosphere to enter the packaging atmosphere if the pressure on the chamber-side of the sheet exceeds the minimum that will open the valve. Without the valve, there is a danger that the pressure of the packaging atmosphere will become so low that the flexible sheet will be detached from the shipping container, thus opening the closed chamber. This danger arises because the rate at which carbon dioxide leaves the packaging atmosphere through the ACM exceeds the rate at which oxygen enters the packaging atmosphere. In some cases, a shipping container may have sufficient air leaks into the packaging atmosphere, or may be deliberately provided with one or more apertures, so that the pressure of the packaging atmosphere remains at or close to atmospheric pressure. However, the presence of a one-way valve makes it unnecessary to make use of such expedients.

The ACMs of the Sixth Aspect of the Invention

The ACM of the sixth aspect of the invention (a) has an area of at least 0.06 m$^2$, and (b) is permeable to oxygen and carbon dioxide and has an R ratio of at least 4.3, preferably at least 5, at least part of the ACM being in the form of a folded sheet obtainable by folding a sheet comprising the ACM in a way which does not substantially reduce the exposed surface of the ACM, for example, does not reduce the effective gas exchange area by more than 25%). The ACM can, for example, be produced by folding a substantially planar ACM into multiple pleats so that the folded sheet has a generally laminar configuration, for example, a configuration which has some substantial thickness (depending, for example, on the dimensions of the pleats) and which is generally planar or part or all of a circle, ellipse, rectangle (including a square) or other open or closed configuration. The folds can be such that the area of the folded sheet, viewed at right angles to the sheet, is at most 0.5 times, preferably at most 0.7 times or at most 0.8 times the area of the sheet before being folded.

ACMs of this kind are used in the assemblies of the third aspect of the invention, and are preferably used when a large effective gas exchange area must be provided in a limited volume. For example, this type of ACM is used in the assemblies of the first aspect of the invention when the substantially closed chamber is (as further discussed below) in the form of a module which is completely surrounded by the packaging atmosphere.

ACMs of the Seventh Aspect of the Invention

The ACMs of the seventh aspect of the invention comprise a porous substrate and a polymeric coating on the substrate, the polymeric coating comprising a polymer which has a melting point below 20° C. and which comprises units derived from one or more n-alkyl acrylates and/or n-alkyl methacrylates in which the n-alkyl moiety contains 10-16 carbon atoms, e.g., 12 or 14 carbon atoms, such units preferably being present in an amount of 30-60%. These ACMs have the useful property that the permeability of the ACM to oxygen and carbon dioxide increases, and the R ratio decreases, relatively rapidly with an increase in temperature in at least part of the temperature range of 0-25° C. (which is the normal temperature range for the storage of respiring biological materials). These temperature-dependent changes in permeability can be useful in adjusting the packaging atmosphere in response to expected or unexpected deviations from the standard storage temperature (which is typically in the region of 3° C. when shipping many biological materials or in the region of 13° C. when shipping bananas and other biological materials which are damaged if they are stored at temperatures in the region of 3° C.)

The Assemblies of the First Aspect of the Invention

In the assemblies of the first aspect of the invention, the ACM (which has an area of at least 0.06 $m^2$, and an R ratio of at least 4.3, preferably at least 5) is preferably part of a substantially closed chamber to which the access of gas can be controlled and which comprises a wall comprising the ACM. These assemblies can have one or more of the following optional characteristics.

(1) There is a single such chamber or a plurality of such chambers, the chambers being the same or different, and the ACMs in the chambers being the same or different.

(2) The chamber is within the container, and when the assembly is in use, the packaging atmosphere is in contact with a first face of the ACM and a second atmosphere is passed through the chamber so that the second atmosphere is in contact with a second, opposite face of the ACM. Optionally, the packaging atmosphere is passed across the first face of the ACM.

(2A) In one of the systems defined in (2) above, the chamber is part of an assembly (sometimes referred to herein as a "module") which is placed within the container and which is substantially completely surrounded by the packaging atmosphere. When the assembly is in use, the packaging atmosphere is in contact with a first face of the ACM and a second atmosphere, for example, air, is passed through the chamber so that the second atmosphere is in contact with a second, opposite face of the ACM. Optionally, the packaging atmosphere is passed across the first face of the ACM.

In one embodiment of this arrangement, the module is secured directly to the container and comprises at least one inlet and at least one outlet connected by rigid conduits to the exterior of the container, so that, in use, the second atmosphere can be passed through the chamber.

In another embodiment, the module is separable from the container and comprises at least one inlet and at least one outlet connected by flexible conduits to the exterior of the container, so that, in use, the second atmosphere can be passed through the chamber. Such a module is preferably placed in the container after the respiring biological material has been loaded into the container, and is removed from the container before the respiring biological material is unloaded from the container. However, the module can be placed in the container before the respiring biological material has been loaded into the container, or during the loading of the respiring biological material into the container.

The module can be of any shape. The shape can suitably be defined by a rigid frame, composed, for example, of one or more of metal, wood and polymeric materials. Often it is convenient for the module to be generally box-shaped, for example, a box having two major faces defined by two relatively large dimensions, and four minor faces defined by one of the large dimensions and a relatively small dimension. For example, each of the large dimensions can be 0.3-12 m (1-40 ft.), e.g., 2-6 m. (6-20 ft.), and the small dimension can be 0.02-0.5 m (1-20 in.), e.g., 0.05-0.25 m (2-9 in). At least one of the walls of the module, for example, one or both of the major faces of a box-shaped module, comprises an ACM. The ACM in the module is preferably an ACM according to the sixth aspect of the invention.

(2B) In another of the systems defined in (2) above, the chamber is formed by (a) part of the container and (b) a generally planar member which extends across a cross-section of the container and which comprises the ACM. That Generally planar member is sometimes referred to herein as a "curtain. Preferably, the chamber is at one end of the container, preferably the loading end of the container, and is defined by the end wall, and part of the side, top and bottom walls at that end of the container and the generally planar member. Such a chamber is preferably created by taping or otherwise securing the curtain comprising the ACM across a cross-section of the container, and then closing the end wall of the container. The assembly comprises at least one inlet to the closed chamber and at least one outlet from the closed chamber, so that, in use, a second atmosphere, for example, air, can be passed through the closed chamber. The ACM is preferably an ACM according to the fifth aspect of the invention.

(3) The chamber is outside the container, and when the assembly is in use, the packaging atmosphere is passed through the chamber in contact with a first face of the ACM and a second atmosphere, for example, air, is in contact with a second, opposite face of the ACM. Optionally, the second atmosphere is passed across the second face of the ACM. The ACM is preferably an ACM according to the sixth aspect of the invention.

(4) The access of gas to the closed chamber can be controlled by reference to any one or more of the variables which will affect the performance of the ACM, including the amount of gas, the type of gas and the flowrate of the gas over one or both of the faces of the ACM. The total gas pressure within, and the rate of gas flow through, the closed chamber can be controlled, for example, through the use of one or more devices to control entry of gas into, and/or exit of gas from, the chamber. Such devices include, for example, compressors, pumps, valves, and other metering devices. The ingredients of the atmosphere which is not packaging atmosphere, and the proportion of each ingredient, can be controlled, for example, by feeding different gases at controlled rates.

The access of gas through the closed chamber can, for example, be controlled by reference to data received from one or more sensors within the container and/or the gas supply and/or the gas leaving the chamber. In one embodiment, the level of carbon dioxide in the packaging atmosphere is measured, and the second atmosphere is passed through the closed chamber when the carbon dioxide level becomes too high, for example, reaches a preset value in the range 3-10%, for example, about 5%. The rate of gas flow from the closed chamber can, for example, be in the range of 6-12, for example, 8-9, cubic feet per minute. There can, for example, be continuous interactive control of pumps and/or valves controlling the gas supply via a feedback loop comprising one or more sensors of gas levels, e.g., oxygen and/or $CO_2$ level, in the atmosphere within the container. The control systems disclosed in U.S. Pat. No. 5,460,841 (Herdeman) and U.S. Pat. No. 5,872,721 (Huston et al.), adapted to the requirements of the present invention, can be used, for example.

(5) The gas which contacts the face of the ACM opposite to the face which is contacted by the packaging atmosphere can, for example, be air or oxygen-enriched air. In some embodiments of the invention, the gas includes an ingredient (other than oxygen and carbon dioxide) which can pass through the ACM into the packaging atmosphere and which has a desired effect on the respiring biological materials surrounded by the packaging atmosphere. In one embodiment, the gas includes an ingredient which promotes ripening of the respiring biological material, for example, ethylene or a compound which produces ethylene, or an ingredient which retards ripening of the respiring biological material, for example, 1-methylcyclopropene. In another embodiment, the gas includes an ingredient which prevents or retards the presence or growth of mold or fungus, for example, chlorine dioxide or sulfur dioxide, or an insecticide or fumigant such as methyl bromide.

The Assemblies of the Second Aspect of the Invention

The assemblies of the second aspect of the invention comprise (1) a substantially closed chamber comprising a wall comprising an atmosphere control member (ACM) which (a) has an area of at least 0.06 m², (b) is permeable to oxygen and carbon dioxide and has an R ratio of at least 4.3, preferably at least 5, (c) has a first surface which is in contact with a first atmosphere and (d) has a second surface which is in contact with a second atmosphere, and (2) means for maintaining a desired difference between the pressure of the first atmosphere and the pressure of the second atmosphere.

We have discovered that the effective R ratio of an ACM is influenced by the difference between the pressure of the atmosphere on one side of the ACM and the pressure of the atmosphere on the other side of the ACM. If the atmospheric pressure of the packaging atmosphere on one side of the ACM is greater than the atmospheric pressure of the second atmosphere on the opposite side of the ACM, then the effective R ratio increases as the pressure difference increases, and vice versa.

In this way, an ACM having a particular R ratio, measured by conventional means, can be made to operate in an unexpected way, namely to have an effective R ratio which is either greater or less than the conventionally measured R ratio.

In most cases, it is useful to make use of this aspect of the invention in order to increase the effective R ratio of an ACM. Any means can be used to produce the desired pressure difference. One convenient way of doing so is provide an inlet for delivering gas into the chamber, and an outlet for removing gas from the chamber, and a controller which can be operated so that the rate at which gas is removed from the chamber is greater than the rate at which gas is passed into the chamber.

Containers

The assemblies of the first aspect of the invention make use of a shipping container, this term being used to include any transportation container, whether it is on a ship, a train or a truck or on the ground, e.g., in a warehouse. Shipping containers are generally composed of metal, and typically have a volume of about 43 or about 86 m³. Such containers are well known to those skilled in the art of storing and transporting fruits and vegetables, and are available in a range of standard sizes. Such containers may be fitted with the piping and gas supplies needed for conventional refrigeration and/or CAP procedures, and can readily be adapted for use in the present invention.

The assemblies of the second and third aspects of the invention, and assemblies including an ACM according to the fourth, fifth, sixth or seventh aspect of the invention, can be used with any type of container, but are particularly useful with containers having a volume of at least 40 m³. The walls of the container can be rigid or flexible, or some of the walls can be rigid and others flexible. The walls can be composed of any material, for example, metal, wood, or a polymeric material. Some or all of the walls can be substantially impervious to one or more of $O_2$, $CO_2$, water vapor and any other gas important to the storage of the respiring biological material; or some or all of the walls can have a limited permeability to such gases.

Temperatures During Storage

The temperature during storage of a respiring biological material will often have an effect on the respiration of the biological material and/or the permeabilities of the ACM to oxygen and carbon dioxide. The temperature can be substantially constant, for example, a temperature used in storage under refrigeration, e.g., 2-6° C., or a temperature of about 13° when storing bananas and other biological materials which are damaged by storage at temperatures of 2-6° C. The temperature can be at a first level during a first storage period and at a different level, e.g., 18-22° C., during one or more other storage periods before or after the first storage.

Packaging the Biological Material in a Plurality of Smaller Containers.

In some embodiments of the invention, the respiring biological material is placed within the container without any additional packaging, or in packaging which does not affect the atmosphere around the biological material, e.g., in cardboard boxes or in polymeric bags or containers which are open or have perforations which are large enough that they have no influence on the flow of oxygen and carbon dioxide. In these embodiments, the atmosphere within the container will be the same as the packaging atmosphere in direct contact with the respiring biological material. However, it is also possible for the respiring biological material, before it is placed in the container having a volume of at least 40 m³, to be packaged in a plurality (e.g., at least 10 or at least 20) of smaller containers which include a conventional relatively small ACM, for example, a selective ACM and/or perforations which modify the rates at which oxygen and carbon dioxide and to the smaller containers. Generally the inner containers are substantially identical containers which contain substantially the same amount of the same biological material. The inner containers may, for example, have a volume which is 0.001 to 0.01 times the volume of the outer container. The absolute size of the inner containers can vary widely; for example, the inner container can contain less than 0.5 kg (1 lb). of respiring biological material, e.g., green beans, up to 25 kg (50 lb) or more of respiring biological material, e.g., bananas, avocados.

The storage of the biological material within the inner and the outer containers can be followed by, and/or preceded by, additional storage within the inner container only. During such additional storage, the packaging atmosphere around the biological material depends upon the respiration of the biological material, the permeability of the inner container (which at this stage is the sole container), and the atmosphere surrounding the inner container, which is often air, but may be another desired atmosphere produced using the techniques of CAP. The temperature during storage of the respiring biological material in the inner container only will often have an effect on the respiration of the biological material and/or the permeability of the container to at least some gases. The temperature during such additional storage can be substantially constant, for example, a temperature at which the inner containers are displayed for retail sale, e.g., 18-21° C., or can be at a first level during a first additional storage period and at a different level during one or more additional storage periods. The temperature during such additional storage can be the same as or different from the temperature during the storage within both containers.

Respiring Biological Materials

This invention is useful for the storage of a wide variety of respiring biological materials, including, for example, asparagus, avocado, broccoli, cantaloupe melons, cherries, mangos and papayas. Suitable materials include the wide range of fruits which ripen (or undergo other changes, for example, in the case of citrus fruits, de-greening) when exposed to ethylene or another ripening agent, for example, apples, apricots, avocados, bananas, blueberries, cherimoyas, dates, figs, kiwis, mangos, melons, peaches, papayas, pears, peppers, persimmons, and plums (all of which go through a climacteric when they ripen), as well as cherries, grapes, lemons, oranges, tomatoes and strawberries. Some aspects of the invention are especially useful for fruits which in commercial practice are ripened in ethylene-containing ripening rooms, for example, avocados, bananas, Bartlett pears, kiwis, mangos, melons, peppers and tomatoes. The invention is particularly useful for the storage of bananas, in particular while they are being transported from the sites at which they are grown to the sites at which they are sold. The present invention makes it easier to control the development of the bananas (from the green state in which they are initially packed to the post-climacteric state in which they are sold at retail) in response to changes in respiration rate, shipping times and the demands of the retail marketplace.

The table below shows the desired atmospheres for the storage of a variety of respiring biological materials, and the R ratio of the ACM which, according to the accepted criteria, should give rise to the desired atmosphere. Our experiments have made it clear that when the container is a shipping container, the desired atmospheres cannot be obtained through the use of such ACMs.

| Produce | desired oxygen | desired carbon dioxide | Calculated R ratio | Actual R ratio required |
|---|---|---|---|---|
| Berries, melons | 2% | 10% | 1.9 | 4.5 |
| Broccoli, bananas | 2% | 5% | 3.8 | 6.5 |
| Apples, pears | 2% | 2% | 9.5 | 13.5 |

The invention is illustrated in the following Examples.

Example 1

A polymer was prepared by copolymerizing tetradecyl acrylate (C14A, the n-alkyl acrylate in which the n-alkyl moiety contains 14 carbon atoms), hexylacrylate (C6A, the n-alkyl acrylate in which the n-alkyl moiety contains 6 carbon atoms, AA (acrylic acid) and MPEG 350 in ratios by weight of 35.2, 26.8, 3, 35. An atmosphere control member was made by coating the polymer onto a Teslin substrate, the thickness of the coating being about 2μ. The table below shows the OTR and R ratio of the atmosphere control member at various temperatures.

| Temperature | OTR (cc/100 in$^2$ · atm · 24 hr) | R ratio |
|---|---|---|
| 22° C. | 77,000 | 8.3 |
| 15° C. | 54,932 | 9.61 |
| 1° C. | 26,315 | 13.1 |

Figure 1A:
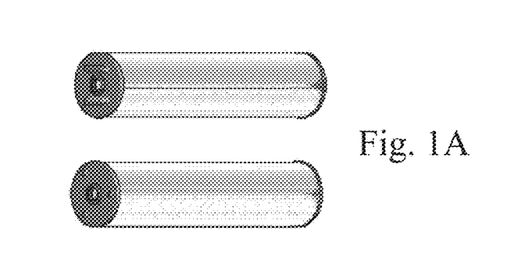
FIG. 1A shows an oblique view of an ACM fashioned into a cartridge according to one or more of the embodiments of the invention.
Figure 1B:
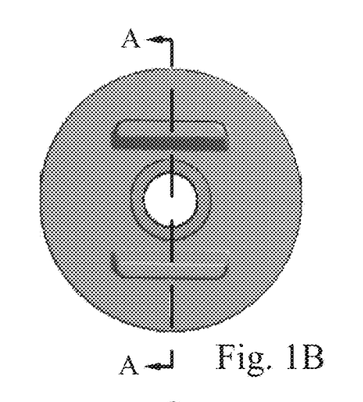
FIG. 1B shows an end view of the ACM of FIG. 1A.
Figure 1C:
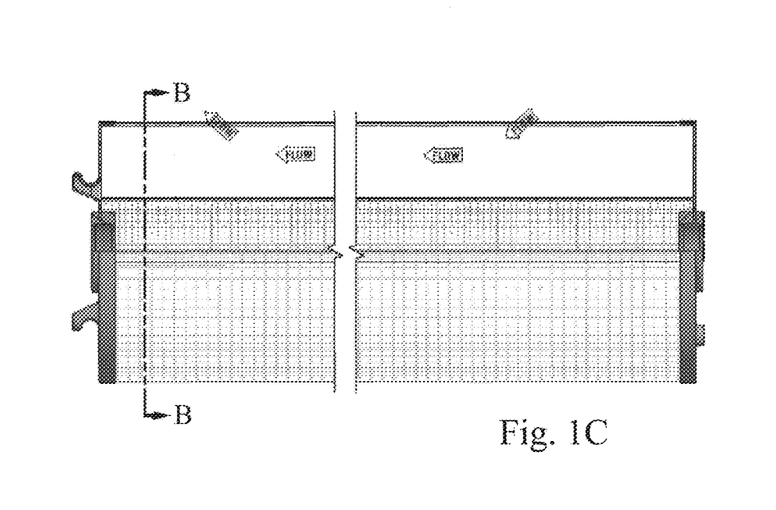
FIG. 1C shows a cross-section of the ACM of FIG. 1A along the line A-A depicted in FIG. 1B.
Figure 1D:
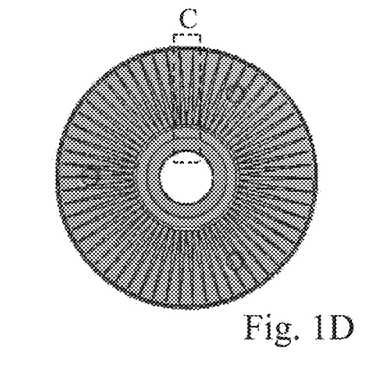
FIG. 1D shows a cross-section of the ACM of FIG. 1A along the line B-B depicted in FIG. 1C.
Figure 1E:
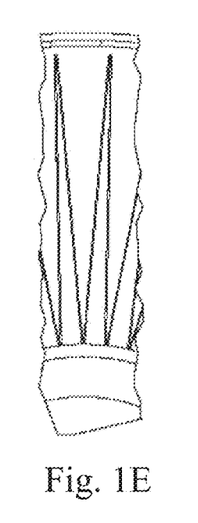
FIG. 1E shows an enlarged view of the cross-section of the ACM of FIG. 1A designated as section C in FIG. 1D.

The atmosphere control member was made into a pleated membrane having 5000 in.$^2$ of membrane, the pleats being around a 2.5 inch diameter, and about 28 inches long, is as illustrated in FIGS. 1A-1E.

An acrylic box having walls 1" in thickness and internal dimensions of 32"×28"×16.5" was constructed with an inlet and outlet hose in one 32"×16.5" face of the box. The cartridge was placed inside the box and connected to the inlet and outlet hoses.

On the outside of the box were two vacuum/air flow pumps whose speed could be regulated with Variac power controllers. The pumps were set up with an inlet pump pushing air through the cartridge and an outlet pump which was pulling air through the cartridge. The effective permeability of the cartridge was calculated by flushing the box with carbon dioxide until an atmosphere of 2.5% oxygen and 35% carbon dioxide was reached. The change in atmosphere was measured at intervals and used to calculate the effective permeability of the cartridge in cc/100 sq.in.atm.24 hrs.

When the outlet pump was run at a faster rate than the inlet pump the R ratio increased. Running the inlet pump faster than the outlet could then be used to reduce the R ratio. Running the outlet pump faster and keeping it at this rate for a 45 minute interval gave a calculated R ratio of 21.8.

| Time interval | Inlet Variac setting | Outlet Variac setting | Calculated OTR cc/100 sq.in · atm · 24 hr | CO$_2$TR/OTR |
|---|---|---|---|---|
| 15 min | 55 | 57 | 22,769 | 1.85 |
| 15 min | 55 | 59 | 17,352 | 3.34 |
| 15 min | 57 | 59 | 7,440 | 8.27 |
| 15 min | 60 | 58 | 25,781 | 1.84 |
| 15 min | 60 | 58 | 41,665 | 1.33 |
| 45 min | 55 | 59 | 1,844 | 21.8 |

A preferred pressure differential from one side of the ACM to the other side is at least 2 inches of water pressure, preferably at least 4 inches of water pressure, preferably at least 5 inches of water pressure. For example, in one experiment where a CO2TR/OTR ratio of 19 resulted where the pressure inside the filter was negative 0.3 inches of water pressure and within the container a positive 4.02 inches of water.

The conventional method for measuring permeability using the GC method is to pass a gas containing 3% O2 15%

CO2 over the top surface of the membrane at a very low flow rate, and the gas which permeates the membrane is carried by a sweep gas of helium into the GC. So both gases are flowing albeit at very low flow rates. The important parameter is that the pressure difference between the top and bottom surfaces is at a minimum and is constant.

Example 2

A polymer was prepared by copolymerizing C14A, C6A, AA, MPEG 350 and MCR-M17 in ratios by weight of 14.7, 11.3, 3, 46, and 25. An atmosphere control member was made by coating the polymer onto a Teslin substrate.

The foregoing description is included to illustrate the preferred embodiments and is not meant to limit the scope of the invention. To the contrary, other embodiments and variations will become apparent to those skilled in the art from the description and examples herein without departing from the scope of the invention, aspects of which are recited by the claims appended hereto.

We claim:
1. A method of controlling packaging atmospheres around respiring biological materials, the method comprising
   (A) providing a substantially closed chamber which (i) contains respiring biological materials surrounded by a packaging atmosphere, (ii) comprises a wall comprising an atmosphere control member (ACM) having a first surface in contact with the packaging atmosphere and a second surface in contact with an atmosphere outside the closed chamber, and (iii) comprises an inlet and an outlet;
   (B) providing a controller which can be operated so that gas is passed into the closed chamber through the inlet at a first rate and gas is removed from the closed chamber through the outlet at a second rate which is greater than the first rate; and
   (C) operating the controller so that gas is passed into the closed chamber at the first rate and removed from the closed chamber at the second rate;
whereby the pressure on the first surface of the ACM is at least 2 inches of water pressure less than the pressure on the second surface of the ACM and the ratio of carbon dioxide to oxygen passing from the first surface to the second surface of the atmosphere control member (ACM), conventionally abbreviated to "R ratio", is greater than the R ratio of the ACM when the R ratio is measured by the conventionally accepted method in which the pressure difference on either side of the ACM is at a minimum.

2. A method according to claim 1 wherein the difference between the first and second pressures is at least 4 inches of water pressure.

3. A method according to claim 1 which comprises adjusting the difference between the pressure on the first surface of the ACM and the pressure on the second surface of the ACM in response to one or both of the oxygen content and the carbon dioxide content of the packaging atmosphere.

4. A method according to claim 1 wherein the ACM has an R ratio of at least 4.3 and an oxygen transmission ratio (OTR) of at least 620,000 ml/m$^2$.atm.24 hr when the OTR and the R ratio are measured at 20° C. and a constant pressure of 0.035 kg/cm$^3$, with the pressure difference on either side of the ACM being at a minimum.

5. A method according to claim 1 wherein the ACM (i) has an R ratio of 1 when the R ratio is measured at 20° C. and a constant pressure of of 0.035 kg/cm$^3$, with the pressure difference on either side of the ACM being at a minimum, and (ii) is selected from the grow consisting of woven materials and nonwoven materials.

6. A method according to claim 1 wherein the ACM comprises a microperforated film.

7. A method according to claim 1 wherein the ACM comprises a porous substrate and a polymeric coating on the substrate.

8. A method according to claim 1 wherein the ACM comprises a porous substrate and a polymeric coating on the substrate, the polymeric coating comprising a polymer which contains 10-90% by weight of units derived from one or more monomers selected from the group consisting of monomers containing a polyoxyalkylene moiety and monomers containing a siloxane moiety.

9. A method according to claim 1 wherein the ACM comprises a porous substrate and a polymeric coating on the substrate, the polymeric coating being selected from the group consisting of (1) a copolymer of tetradecyl acrylate, hexyl acrylate, acrylic acid, polyethylene glycol methacrylate and polydimethyl siloxane terminated at one end only by a methacryoyloxypropyl group, in proportions of 14-15 tetradecyl acrylate, 10-12 hexyl acrylate, about 3 acrylic acid, about 46 polyethylene glycol methacrylate and about 25 polydimethyl siloxane terminated at one end only by a methacryoyloxypropyl group, and (2) a copolymer of dodecyl acrylate, acrylic acid, polyethylene glycol methacrylate, and polydimethyl siloxane terminated at one end only by a methacryoyloxypropyl group in proportions of 24-28 dodecyl acrylate, about 3 acrylic acid, about 31 polyethylene glycol methacrylate, and about 40 polydimethyl siloxane terminated at one end only by a methacryoyloxypropyl group.

10. A method of controlling packaging atmospheres around respiring biological materials, the method comprising
   (A) providing a substantially closed chamber which (i) contains respiring biological materials surrounded by a packaging atmosphere, (ii) comprises a wall comprising an atmosphere control member (ACM) having a first surface in contact with the packaging atmosphere and a second surface in contact with an atmosphere outside the closed chamber, and (iii) comprises an inlet and an outlet;
   (B) providing a controller which can be operated so that gas is passed into the closed chamber through the inlet at a first rate and gas is removed from the closed chamber through the outlet at a second rate which is less than the first rate; and
   (C) operating the controller so that gas is passed into the closed chamber at the first rate and removed from the closed chamber at the second rate;
whereby (i) the pressure on the first surface of the ACM is at least 2 inches of water pressure greater than the pressure on the second surface of the ACM, and (ii) the ratio of carbon dioxide to oxygen passing from the first-surface to the second surface of the atmosphere control member (ACM), conventionally abbreviated to "R ratio", is less than the R ratio of the ACM when the R ratio is measured by the conventionally accepted method in which the pressure difference on either side of the ACM is at a minimum.

11. A method according to claim 10 wherein the difference between the pressure on the first surface of the ACM and the pressure on the second surface of the ACM is at least 4 inches of water pressure.

12. A method according to claim 10 which comprises adjusting the difference between the pressure on the first surface of the ACM and the pressure on the second surface of the ACM in response to one or both of the oxygen content and the carbon dioxide content of the packaging atmosphere.

13. A method according to claim 10 wherein the ACM has an R ratio of at least 4.3 and an oxygen transmission ratio (OTR) of at least 620,000 ml/m$^2$.atm.24 hr when the OTR and the R ratio are measured at 20° C. and a constant pressure of 0.035 kg/cm$^3$, with the pressure difference on either side of the ACM being at a minimum.

14. A method according to claim 10 wherein the ACM comprises a porous substrate and a polymeric coating on the substrate, the polymeric coating comprising a polymer which has a melting point below 20° C. and which comprises units derived from one or more monomers selected from the group consisting of n-alkyl acrylates in which the n-alkyl moiety contains 10-16 carbon atoms and n-alkyl methacrylates in which the n-alkyl moiety contains 10-16 carbon atoms.

15. A method according to claim 10 wherein the ACM comprises a porous substrate and a polymeric coating on the substrate, the polymeric coating comprising a polymer which contains 10-90% by weight of units derived from one or more monomers selected from the group consisting of monomers containing a polyoxyalkylene moiety and monomers containing a siloxane moiety.

16. A method according to claim 10 wherein the ACM comprises a porous substrate and a polymeric coating on the substrate, the polymeric coating comprising a polymer which contains 10-90% by weight of units derived from one or more monomers selected from the group consisting of monomers containing a polyoxyalkylene moiety and monomers containing a siloxane moiety.

17. A method according to claim 10 wherein the ACM comprises a porous substrate and a polymeric coating on the substrate, the polymeric coating being selected from the group consisting of (1) a copolymer of tetradecyl acrylate, hexyl acrylate, acrylic acid, polyethylene glycol methacrylate and polydimethyl siloxane terminated at one end only by a methacryoyloxypropyl group, in proportions of 14-15 tetradecyl acrylate, 10-12 hexyl acrylate, about 3 acrylic acid, about 46 polyethylene glycol methacrylate and about 25 polydimethyl siloxane terminated at one end only by a methacryoyloxypropyl group, and (2) a copolymer of dodecyl acrylate, acrylic acid, polyethylene glycol methacrylate, and polydimethyl siloxane terminated at one end only by a methacryoyloxypropyl group in proportions of 24-28 dodecyl acrylate, about 3 acrylic acid, about 31 polyethylene glycol methacrylate, and about 40 polydimethyl siloxane terminated at one end only by a methacryoyloxypropyl group.

* * * * *

UNITED STATES PATENT AND TRADEMARK OFFICE
CERTIFICATE OF CORRECTION

PATENT NO. : 10,420,352 B2
APPLICATION NO. : 14/943022
DATED : September 24, 2019
INVENTOR(S) : Clarke et al.

Page 1 of 1

It is certified that error appears in the above-identified patent and that said Letters Patent is hereby corrected as shown below:

On the Title Page

Replace item (63) paragraph with the following:
--Continuation of application No. 13/748,384, filed on Jan. 23, 2013, now Pat. No. 9,185,920.--

In the Specification

Column 1, Lines 7-9:
Delete "This application is a continuation of, and claims the priority of, U.S. patent application Ser. No. 13/784,384, filed Mar. 4, 2013, now U.S. Pat. No. 9,185,920." and replace with --This application is a continuation of, and claims the priority of, U.S. patent application Ser. No. 13/748,384, filed Jan. 23, 2013, now Pat. No. 9,185,920.--

Signed and Sealed this
Seventh Day of May, 2024

Katherine Kelly Vidal
*Director of the United States Patent and Trademark Office*